Feb. 13, 1934.     M. B. ZOLL     1,947,370
APPARATUS FOR MEASURING GASES
Original Filed Feb. 1, 1930
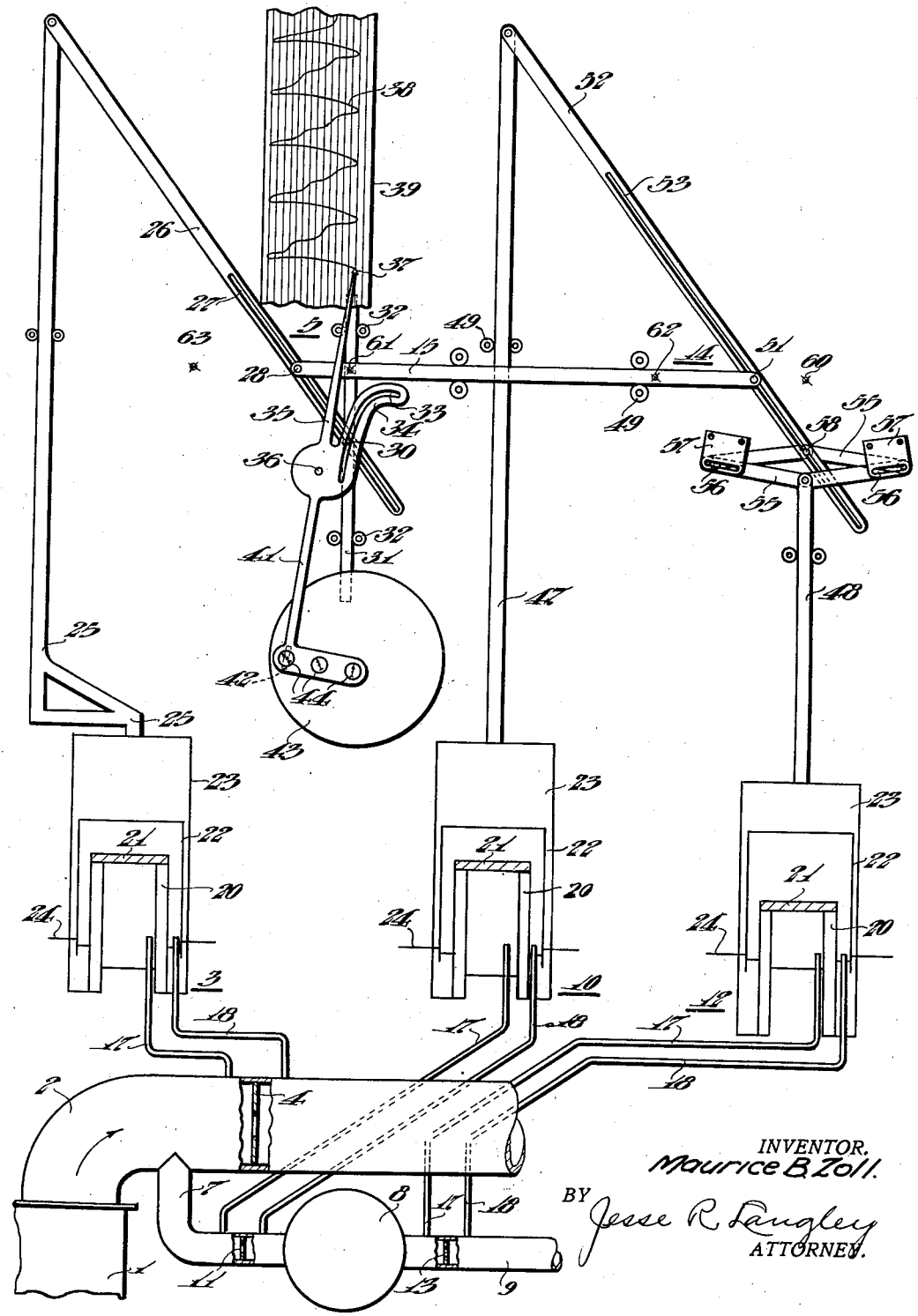
INVENTOR.
Maurice B. Zoll.
BY Jesse R. Langley
ATTORNEY.

Patented Feb. 13, 1934

1,947,370

UNITED STATES PATENT OFFICE 1,947,370

APPARATUS FOR MEASURING GASES

Maurice B. Zoll, Fort Wayne, Ind., assignor to The Western Gas Construction Company, a corporation of Indiana Application February 1, 1930, Serial No. 425,180
Renewed April 18, 1933

14 Claims. (Cl. 234—34)

This invention relates to an apparatus for measuring gases, particularly fuel gases such as producer gas, water gas and the like.

This invention is an improvement on the apparatus of the copending application of Thomas W. Stone, filed June 20, 1927, Serial No. 200,254.

Prior to the invention set forth in the above noted copending application there has been no simple and reliable means for measuring the effective quantity of gas contained in raw gas of several constituents in various and varying quantities.

Prior to that invention there was no practical means for determining, at any desired instant, the percentage of standard or effective gas being generated by a water-gas machine or the like.

The apparatus of the copending application includes a plurality of orifice meters, and suitable computations based on the simultaneous readings of the several meters show how much permanent gas at ordinary standard conditions, particularly a standard temperature, is included in the hot moist gases passing from the tar batter outlet of a water gas machine.

An object of the present invention is to provide suitable interconnecting mechanism between the several meters for permitting the direct reading of the equivalent amount of permanent gases at standard conditions and thus render it unnecessary to note and compare simultaneous readings of several meters.

Other objects of the present invention include the provision of apparatus for continuously recording the readings of the amount of permanent gas at standard conditions and for integrating or totalizing such readings.

In the accompanying drawing, the single figure is a partially diagrammatic view of apparatus illustrating a preferred form of my invention.

In the drawing, a tar batter or wash box 1, only a portion of which is shown, of a water gas machine (not shown) sends raw gas through a suitable offtake pipe 2 to a relief holder (not shown) which will ordinarily be located at some distance from the water-gas set. The conduit pipe 2 is usually thirty to thirty-six inches in diameter, the direction of flow of raw gas being indicated by an arrow.

A flow meter 3 comprising an orifice diaphragm 4 located in pipe 2 actuates an indicating and recording mechanism 5. The recording mechanism 5, if unaffected by the remainder of the apparatus of my invention, would record the flow of raw gas through pipe 2.

A continuous sample of raw gas passes from pipe 2 through pipe 7 and through a correction apparatus 8 which may be a condenser, for example, for cooling the gas to a standard temperature and removing all vapors in excess of the saturation point for that temperature. If the correction apparatus 8 is a condenser it may be provided with cooling tubes or a cooling spray. The correction apparatus 8 might also be a dessicating device, for example, and have no effect on the temperature of the gas.

The corrected sample leaves condenser 8 through a pipe 9. A suction pump may lead the corrected sample from pipe 9 to pipe 2 although the pressure differential set up by the orifice plate 4 in pipe 2 is usually sufficient to propel the sample through pipes 7 and 9.

A raw sample flow meter 10 includes an orifice diaphragm 11 located in pipe 7. A corrected sample flow meter 12 has an orifice plate 13 located in corrected sample pipe 9. Both the meters 10 and 12 actuate a proportioning or correction device 14.

The correction device 14 is connected to the indicating and recording mechanism 5 by means of a bar 15. The correcting device 14 actuates bar 15 and movement of the bar 15 so modifies the effect of flow meter 3 on the recording mechanism 5 that it does not record the amount of raw gas passing through orifice 4 but records what this amount would have been if all of the gas passing through pipe 2 had been corrected.

The orifice meters 3, 10 and 12 may be any one of several different types. Each of the three meters shown for illustrative purposes have similar parts that bear like reference numerals.

Each comprises pressure tubes 17 and 18 that lead from each side of the corresponding orifice plates or diaphragms to the interior and exterior of a thick walled bell 20. The bell 20 differs from the bell of the usual gasometer in having thick walls and it is provided with a weight 21. The bell is also covered or enclosed by a stationary gas-tight hood 22. A bail 23 is necessary for transmitting movement of the bell 20 to the exterior of the hood 22. The level of the water or liquor outside of the hood 22 is at 24.

It is necessary to provide each of the bells 3, 10 and 12 with double walls or thick walls in order that the rise of the bell shall be proportional to the difference of pressure of gas inside and outside the same. The ordinary gasometer bell having side walls of slight thickness tends to rise in proportion to the volume of gas supplied thereto and tends to keep the pressure constant in the gas line connected thereto. That is, below a given pressure the ordinary bell tends to descend to its lowermost position and above this pressure it tends to rise the maximum distance.

The interior of each bell is in communication with the high pressure side of the corresponding orifice diaphragm through pressure line 17. The space between the exterior of each bell and the interior of the hood 22 is in communication with the low pressure side of the corresponding diaphragm through pressure line 18. When there is little pressure difference between lines 17 and 18 the bell 20 is only lifted a slight distance out of the water, although the amount of gas available for passing through pressure line 17 is almost unlimited. When the pressure difference between lines 17 and 18 is high, for example, 18 inches of water, the bell 20 rises almost to its maximum height of travel.

Rising of the bell 20 of flow meter 3 and the rod 25 connected thereto due to an increased flow of gases and vapors through orifice 4 increases the steepness of angle of lever 26 and its slot 27 by moving about pin 28 as a fulcrum. Pin 28 is mounted on bar 15 and assuming for the instant, that bar 15 remains stationary, such increase of the steepness of angle of the slot 27 lowers the pin 30 which is mounted on a vertical slide rod 31 guided by rollers 32.

Lowering of the pin 30 along a straight line moves the same downward through a curved slot 33 in a curved arm 34. Downward movement of the pin 30 displaces curved arm 34 to the right, as shown in the drawing, and rotates the indicating needle 35 about pivot 36.

A marking device 37, such as a pen or stylus, on the end of the needle 35 makes a continuous record 38 of the indications on a graduated strip of paper 39 moved by clockwork (not shown).

The curve of slot 33 in arm 34 is necessary because the inner and outer surfaces of the thick walls of the bells 20 are parallel in cross-section, that is, they are equally spaced from each other through the entire height of each bell. The movement of a double walled or thick walled bell having walls of uniform thickness is proportional to the square root of the difference in pressures between the inside and outside of the same.

Therefore, if equal increments in the volume of gas passing through an orifice, such as orifice diaphragm 4, are to be indicated by equal amounts of travel of the needle 35 across the recording strip of paper 39, a curved correction slot, such as 33, is necessary. Otherwise the thickness of the walls would have to be variable throughout the height of each bell in order to correct for the square root function occurring in the formula and produce equally spaced readings on the recording strip.

A totalizer arm 41 projects in the opposite direction from that of the recording needle 35 and is integral therewith. It carries a wheel 42 which bears against integrator disc 43 rotated at a uniform rate by clockwork (not shown). Dials 44 record the total volume of gas which is indicated graphically by line 38 on paper strip 39.

When the indicating needle 35 records a high reading on paper strip 39 near the right hand edge thereof, as shown in the drawing, the totalizer arm 41 presses the wheel 42 against the fast moving periphery of integrator disc 43.

When a low reading is being recorded near the left-hand edge of paper strip 39 by needle 35, the arm 41 is pressing the wheel 42 against a slow moving portion of the disc 43 near the center thereof.

The proportioning or correcting linkage 14 is actuated by flow meters 10 and 12 by means of rods 47 and 48. The linkage 14 actuates the bar 15 thereby moving the fulcrum pin 28 of indicating and recording mechanism 5.

Bar 15 is guided in a horizontal direction by rollers 49. The rod or bar 15 carries a pin 51 at its other end. A lever 52, provided with a slot 53, has its angle of inclination with respect to the horizontal increased by the rising of rod 47 attached to bell 20 of flow meter 10.

Parallel motion or lazy-tong links 55 attached to the upper end of rod 48 and guided by slots 56 in plates 57 have the effect of reversing the motion of rod 48. That is, upward travel of the rod 48 causes an approximately equal movement of a pin 58 in a downward direction. Pin 58 acts on lever 52 since it projects through slot 53.

Upward travel of rod 48 attached to bell 20 of flow meter 12 has the same effect on the inclination of the lever 52 as upward movement of rod 47 actuated by flow meter 10, due to the presence of the reverse motion lazy tong links 51.

In general the operation of the apparatus is such that if changes of inclination of lever 52 leave pin 51 stationary, due to meters 10 and 12 both registering corresponding increases or decreases of flow, no effect is had on the indicating mechanism 5 because fulcrum pin 28 mounted on the same slide rod 15 as pin 51 remains stationary. Such a rise in the position of both rods 47 and 48 might be due to an increase in the amount of the sample of gas passing through pipe 7 without any change occurring in the composition of the sample.

Should rod 48 rise while rod 47 remains stationary, pin 58 is lowered, pin 51 is moved to the left, as shown in the figure, pin 28 is moved to the left an equal amount, pin 30 is lowered and the effect of any rise of rod 25 is increased due to the spacing of fulcrum pin 28 farther from vertical rod 31.

A rise in the position of bell 20 of meter 12 without change in the position of the bell of meter 10 may be brought about by an increase in the percentage of permanent gas in the sample, such increase taking place while the total amount of vapors and gas drawn into pipe 7 remains constant.

A change in the amount of continuous sample passing through pipe 7 causes a simultaneous rise or fall of the bells of meters 10 and 12 and does not tend to move slide rod 15. The amount of sample does not influence the indications of meter 3 measuring the volume of vapors and gases passing through main pipe 2.

Fluctuations in the composition of the mixture of vapors and gases causes the bells of meters 10 and 12 to move slide bar 15, thereby increasing or decreasing the leverage of lever 26 about the fulcrum pin 28 and modifies the indications from flow meter 3 accordingly.

The inclination of the slots 56 in the stationary plates 57 is capable of slightly increasing or decreasing the amount of motion transmitted from rod 48 to pin 58. That is, with a certain inclination of slots 56, 1" of travel of the rod or bar 48 might result in 1¼" of travel of the pin 58. An opposite inclination of the slots 56 might transmit 1″ of travel of the bar 48 so as to move pin 58 through only ¾″ of travel.

The inclination of the slots 56 is adjusted according to the final or standard temperature of the gases passing through orifice plate 13. For example, if the standard temperature were changed from 60° C. to some other standard the inclination of the slots 56 would be adjusted to a new angle corresponding to the different temperature.

The general operation of the entire apparatus can be illustrated as follows:

Assume a somewhat extreme or theoretical condition in which quite a large volume of hot vapors are passing through orifice 4 and a corresponding sample of the same passing through orifice 11, and assume that there are no permanent gases included in the mixture of hot vapors, then all of the sample passing through orifice 11 is condensed in condenser 8, there is nothing left to pass through orifice 13, there is no pressure differential between lines 17 and 18 of meter 12 and vertical rod 48 assumes its lowermost position.

The reverse motion toggle links 55 then move pin 58 to its highest position which is at point 60 in alignment with horizontal slide rod 15. By means of slot 53 in lever 52, pin 51 attached to the end of slide rod 15 is moved, in theory at least, all the way to zero point 60. Such movement of the slide bar 15 carries the pin 28, in theory, all the way to point 61 which is in alignment with the vertical slide bar 31.

When pin 28 is at point 61 no amount of movement of meter 3, rod 25 or lever 26 can move the pin 30 downward since the lever 26 is pivoted about point 61 and since point 61 is in alignment with the path of travel of pin 30, any change in the angularity of lever 26 fails to move pin 30 downward. In other words, the needle 35 would continue to register zero in the recording strip of paper 39 even if a considerable volume of vapors were passing through orifices 4 and 11.

This is as it should be, because no values should be recorded when no permanent gases are passing through orifice plate 4. It is designed to indicate and record only that portion of the mixture passing through orifice 4 that will remain after cooling to a standard temperature and if the percentage of such gases is zero the instrument should register zero.

Assume a different condition, also somewhat extreme and theoretical, in which there are no condensible vapors included in the mixture that is passing through orifice 4. Also assume that the mixture passing through orifice 4 and the sample thereof passing through orifice 11 are at the standard temperature so that the condenser 8 has no effect on the same, and just as much gas passes out of the condenser through orifice 13 as enters through orifice 11.

This results in such a high position of the bell of meter 12 and of rod 48 that pin 58 is carried to a very low point and pin 51 on bar 15 will, in theory, be moved to the left to point 62 which is exactly midway between the vertical rods 47 and 48.

When pin 51 moves to point 62 fulcrum pin 28 is located at point 63, which point is very close to the rod 25. If the lever 26 were pivoted about point 63, a small movement of flow meter 3 or vertical rod 25 would result in a very large movement of the needle 35 which is correct, because in this assumption all of the mixture passing through orifice 4 is permanent gas at the standard temperature.

The toggle links 55 and the slots 56 as actually constructed may not be long enough to lower pin 58 sufficiently to move pin 51 by means of slot 53 to point 62. This merely means that the linkage is proportioned for practical conditions only and does not take care of theoretical conditions which are useful only in making a study of the apparatus.

The parts of the proportional linkage system 29 are shown in the drawing in the positions which they would assume for the following conditions:

Gas is passing through orifice 4 at the rate of 12,000 cu. ft. per minute at a temperature of 180° C. and it is completely saturated with steam and other vapors at that temperature. The condenser 8 cools off the sample passing therethrough to a standard temperature of 60° C. and if the entire 12,000 cu. ft. were cooled to this standard temperature its volume would be 4,875 cu. ft.

That is, it has one-third of its original volume and that is the decrease that actually occurs in the continuous sample passing through orifices 11 and 13. Since in the illustrated example scarcely more than one-third as great a volume of gas passes through orifice 13 as passes through orifice 11 the lever 52 is tilted accordingly by the two meters 10 and 12. This locates fulcrum pin 28 so that the movement of vertical rod 25 corresponding to 12,000 cu. ft. is reduced to a reading of 4,875 cu. ft. on the record strip 39.

Assume still another set of conditions in which the amount of permanent gas remains the same as in the preceding example, namely, 4,875 cu. ft. This would result in the identical volume of gas passing through orifice 13, and meter 12 and pin 58 would remain in the positions shown in the drawing and which are the same as in the preceding example. Assume, moreover, that this same amount of permanent gas is accompanied by a much smaller amount of steam and other condensible vapors. This results in a smaller volume of gas passing through orifices 4 and 11 and results in lower positions for the bells of meters 3 and 10 and lower positions for the vertical rods 25 and 47.

If the amount of permanent gas contained in the mixture passing through pipe 2 and the amount of permanent gas being metered by orifice 13 is the same, then the bells of meters 3 and 10 and the ends of levers 26 and 52 will be lowered like amounts. This results in a movement of the slide rod 15 to the left and movement of pins 28 and 51 to the left as viewed in the drawing.

Since the two levers 26 and 52 are moved to the left through equal angles not only will lever 52 be pivoted about pin 58, but lever 26 will swing about pin 30 as a pivot. Pin 30 is free to be moved, of course, but if the new position of lever 26 does not move it, the indication of pointer 35 remains the same which is correct since the same amount of gas passes through orifice 17.

Advantages of the method of and apparatus for my invention are extreme simplicity for the results accomplished. The metering apparatus consists of orifices and bells instead of intricate moving parts. The computations required to secure the final result from the several meter readings are continuously and automatically performed and the result is recorded by a set of relatively simple proportioning levers.

The apparatus of my invention is not limited to temperature corrections. It is applicable generally where it is desired to record the amount of gas that would be passing through a pipe if all of it had some of its properties corrected to some standard condition and it is only convenient to subject part of the stream of uncorrected or raw gas passing through such pipe to the standardizing process. The standardizing may consist, for example, of a dessication, a saturation, or a purification as well as a temperature correction. It may cause an increase of volume as well as a decrease.

The single figure of the drawing is limited to correction by cooling with corresponding vapor elimination and decrease in volume but this single embodiment of my invention is intended for illustrative purposes only.

I claim as my invention:

1. Apparatus for determining the amount of corrected gas in a stream of raw gas comprising an orifice meter for said stream, means for diverting a continuous sample of the mixture from said stream, an orifice meter for said continuous sample, means for correcting the continuous sample, an orifice meter for the corrected sample, mechanism positioned by the relative readings of the continuous sample and corrected sample meters, and means for reducing the reading of the first-named meter in accordance with the position of said mechanism.

2. Apparatus for determining the volume of corrected gas contained in a mixture of raw gas passing through a pipe, said apparatus comprising an orifice meter for the pipe, a tube for withdrawing a sample from said pipe, correcting means in the tube, two orifice meters for the tube, one of which is located on each side of the correcting means, a movable pivot, a lever mounted on said pivot for indicating the readings of the orifice meter for said pipe, a second lever for moving said pivot, the second lever being so connected to the two meters for the tube that the movement of said pivot is proportional to the relative quantity of corrected gas in the continuous sample.

3. Apparatus comprising a pipe for conducting a gaseous mixture, a tube for withdrawing a sample of said gaseous mixture from the pipe, means for removing certain constituents from the said sample, a meter for the tube on each side of said means, a meter for the pipe, an indicating device, connections between said pipe meter and the indicating device, differential connections controlled by differences of readings of the tube meters for decreasing the indications of said meter for the pipe in proportion to the removal of said certain constitutents.

4. Apparatus comprising a meter for measuring the total flow of a gaseous mixture, a second meter for measuring the flow of a sample of the gaseous mixture, means for immediately reducing the sample to the condition to be later assumed by the entire mixture, a third meter for measuring said reduced sample, an indicator connected to the first mentioned meter, and a differential device between the second and third meters responsive to differences between their measurements for correspondingly influencing said indicator.

5. Means for reducing a current of a gaseous mixture to a standard saturation and temperature, an orifice on each side of said reducing means, a bell so connected to each orifice as to rise with increase of velocity of gases therethrough, a lever having one end direct connected to one bell, a reverse motion linkage for connecting the other end of the lever to the other bell and a connecting link responsive largely to bodily displacements of said lever and only slightly responsive to angular movements of said lever.

6. Apparatus comprising a pipe, an orifice diaphragm, a thick walled bell, pressure lines from each side of the diaphragm to the interior and exterior of said bell, said thick walls being of uniform thickness, a fulcrum, a lever tilted about said fulcrum by movement of the bell, a pin constrained to move in a straight line, a curved arm adjacent the pin and an indicating needle movable with the curved arm, said lever actuating said pin and the curvature of said arm causing equal movements of the needle to be produced by equal increments in the flow of a gas through the orifice.

7. Apparatus comprising a pipe, an orifice diaphragm, a thick walled bell, pressure lines from each side of the diaphragm to the interior and exterior of said bell, a fulcrum, a lever tilted about said fulcrum by movement of the bell, a pin moved by said lever, a slotted arm actuated by the pin, an indicating needle movable with the slotted arm, the thick walls of said bell and the dimensions of said lever and of said slotted arm causing equal movements of the needle to be produced by equal increments in the flow of a gas through the orifice, and means for moving said fulcrum in proportion to the amount of correctable volume in the gas passing through said orifice.

8. Apparatus for determining the volume of gas under standard conditions contained in a stream of raw gas comprising means for sampling the stream of raw gas, means for standardizing the sample, a meter for the stream of raw gas, a meter for the sample of raw gas, a meter for the standardized gas, a lever having one end directly connected to the meter for the sample of raw gas, a reverse mechanism, said lever having its opposite end connected through the reverse mechanism to the meter for the standardized gas, a proportioning slide bar, a recording lever having one end connected to the meter for the stream of raw gas, a fulcrum for the recording lever positioned by the proportioning slide bar, and a recording device actuated by the other end of the recording lever.

9. A flow meter for a pipe, a recording mechanism actuated by the flow meter, means for withdrawing a sample of the fluid being metered from the pipe, means for removing undesired constituents from said sample, and a device responsive to the change of volume resulting from the removal of said undesired constituents and means for decreasing the readings of said recording mechanism in proportion to said change of volume.

10. A pipe for conducting fluid, a flow meter for the pipe, a recording apparatus actuated by the flow meter, a tube for taking a sample of the fluid from the pipe, means for standardizing conditions of said fluid and a device responsive to change of volume resulting from said standardizing for modifying the action of the recording apparatus.

11. Apparatus for measuring the amount of corrected gas in a current of raw gas which comprises means for measuring the rate of flow of said raw gas, means for measuring the proportion of corrected gas in a sample of said raw gas, and means for modifying the measurement of said raw gas in accordance with said proportion.

12. Apparatus for measuring the amount of corrected gas in a current of raw gas which comprises means for continuously measuring the rate of flow of said raw gas, means for continuously measuring the proportion of corrected gas in a sample of said raw gas, and means for continuously modifying the measurement of said raw gas in accordance with said proportion.

13. Apparatus for measuring the amount of corrected gas in a current of raw gas which comprises means for continuously measuring the rate of flow of said raw gas, means for continuously measuring the proportion of corrected gas in a sample of said raw gas, means for continuously modifying the measurement of said raw gas in accordance with said proportion, and means for continuously recording said modified measurement.

14. Apparatus for measuring the amount of corrected gas in a current of raw gas which comprises recording means responsive to the rate of flow of said raw gas and means responsive to the proportion of corrected gas in said raw gas for modifying the effect of the operation of the first-named means.

MAURICE B. ZOLL.